United States Patent
Abzarian et al.

(10) Patent No.: US 9,542,337 B2
(45) Date of Patent: Jan. 10, 2017

(54) DEVICE SIDE HOST INTEGRITY VALIDATION

(71) Applicant: Microsoft Technology Licensing, LLC, Redmond, WA (US)

(72) Inventors: David Abzarian, Kirkland, WA (US); Todd L. Carpenter, Monroe, WA (US); Harish S. Kulkarni, Redmond, WA (US); Salahuddin J. Khan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/458,223

(22) Filed: Aug. 12, 2014

(65) Prior Publication Data

US 2014/0351544 A1     Nov. 27, 2014

Related U.S. Application Data

(63) Continuation of application No. 12/349,516, filed on Jan. 7, 2009, now Pat. No. 8,806,220.

(51) Int. Cl.
     *G06F 12/14*          (2006.01)
     *G06F 21/57*          (2013.01)

(52) U.S. Cl.
     CPC .......... *G06F 12/1416* (2013.01); *G06F 21/57* (2013.01); *G06F 2212/1052* (2013.01); *G06F 2221/2101* (2013.01)

(58) Field of Classification Search
     CPC .... G06F 9/4401; G06F 12/14; G06F 12/1408; G06F 12/1416; G06F 21/00; G06F 21/44; G06F 21/57; G06F 21/575; G06F 21/60; G06F 21/602; G06F 21/64; G06F 2212/1052; G06F 2221/2101; G06F 2221/2107; H04L 63/0428; H04L 63/083; H04L 63/12
See application file for complete search history.

(56) References Cited

U.S. PATENT DOCUMENTS

| | | | |
|---|---|---|---|
| 8,321,931 B2* | 11/2012 | Zimmer et al. | 726/21 |
| 9,083,746 B2* | 7/2015 | Hamid | G06F 21/606 |
| 9,135,446 B2* | 9/2015 | Triantafillou | G06F 21/57 |
| 2003/0233558 A1* | 12/2003 | Lieberman et al. | 713/189 |
| 2006/0059553 A1* | 3/2006 | Morais et al. | 726/22 |
| 2006/0161445 A1* | 7/2006 | Frank | 705/1 |

(Continued)

*Primary Examiner* — Amir Mehrmanesh
(74) *Attorney, Agent, or Firm* — Sunah Lee; Dan Choi; Micky Minhas

(57) ABSTRACT

Described is a technology by which a transient storage device or secure execution environment-based (e.g., including an embedded processor) device validates a host computer system. The device compares hashes of host system data against valid hashes maintained in protected storage of the device. The host data may be a file, data block, and/or memory contents. The device takes action when the host system data does not match the information in protected storage, such as to log information about the mismatch and/or provide an indication of validation failure, e.g., via an LED and/or display screen output. Further, the comparison may be part of a boot process validation, and the action may prevent the boot process from continuing, or replace an invalid file. Alternatively, the validation may take place at anytime.

20 Claims, 5 Drawing Sheets

(56) References Cited

U.S. PATENT DOCUMENTS

| | | | |
|---|---|---|---|
| 2007/0033419 A1* | 2/2007 | Kocher et al. | 713/193 |
| 2007/0143629 A1* | 6/2007 | Hardjono et al. | 713/189 |
| 2009/0049309 A1* | 2/2009 | Brinker et al. | 713/189 |
| 2009/0049510 A1* | 2/2009 | Zhang et al. | 726/1 |
| 2009/0113210 A1* | 4/2009 | Westerinen et al. | 713/187 |
| 2010/0062844 A1* | 3/2010 | Crowder et al. | 463/29 |
| 2010/0281273 A1* | 11/2010 | Lee et al. | 713/190 |
| 2015/0370726 A1* | 12/2015 | Hashimoto | G06F 21/575 711/163 |
| 2015/0370728 A1* | 12/2015 | Yamada | G06F 12/1416 711/163 |

\* cited by examiner

| ID# | Collection ID | Location | File | Hash | Compute | Hash OID | Display String |
|---|---|---|---|---|---|---|---|
| 1 | 1 | \Personal | sample.txt | 5fd129faabcd 4567b692 ... | Device Side | ~~~~ | |
| 1 | 2 | \Personal | sample.txt | 5fd129faabcd 4567b692 ... | Device Side | ~~~~ | |
| 2 | 2 | \Windows\ System32 | special.sys | d7a8fbb3 07d78094 69ca9abc b0082e4f 8d5651e4 6d3cdb76 2d02d0bf 37c9e592 | Host Side | ~~~~ | |

*FIG. 5*

DEVICE SIDE HOST INTEGRITY VALIDATION

BACKGROUND

Tampering with computer systems is a major problem faced by users of shared access terminals and users of personal computers that are not physically protected against access. The most common form of tampering is file modification for the purposes of installing Trojans or viruses on a victim's terminal. If the attacker has physical access to the system's disk, the attacker may further modify the configuration of anti-virus and other security software, allowing the tampering to go undetected.

Current solutions for detecting disk tampering rely on host software. However the host software itself can be easily circumvented or modified to avoid detection.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a device, such as a transient storage device or other secure execution environment (e.g., based upon an embedded processor device), validates a host computer system by comparing host system data against information maintained in protected storage of the device. The host data may be a file, data block, memory contents and so forth, and the information maintained in protected storage may be corresponding hash values representative of what the host data contains when valid. The device takes action when the host system data does not match the information in protected storage, such as to provide an indication of validation failure, e.g., via an LED and/or display screen output, and/or log information about the mismatch.

In one aspect, the device compares the hash values of files as part of a boot process validation, such as to prevent the boot process from continuing, recommend cancellation of the boot process, or replace an invalid file. In another aspect, the validation may take place at anytime ("anytime validation"), which may include comparing memory contents and/or host system files.

In one aspect, the device may include a processor for computing the hash. Alternatively, the hash may be performed by a host system processor. The user may be given an option to select where the hash is computed.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 5 is a representation of a data structure that may be used for maintaining catalog information on a validation device that is related to validating the integrity of a host computer system.

DETAILED DESCRIPTION

Various aspects of the technology described herein are generally directed towards verifying the integrity of a host computer system by inspecting the host computer system via a transient storage device (such as a USB flash drive, or UFD) or other secure execution environment (e.g., including an embedded processor), containing protected storage and (possibly) cryptographic hardware. In one aspect corresponding to a first mode of operation, the host computer system is booted from the device, whereby the device controls the boot process and thus may validate files and/or individual blocks on the host computer system's disk through a secure bootloader. This validation occurs before transferring control of the remainder of the boot process to the operating system and its files residing on disk. In one implementation, if the files have been modified or corrupted, the user may choose (in advance or on demand) to replace the files residing on the host disk with untampered versions (or versions known to be good by the user or original software vendor) residing on the transient storage device. In an alternative aspect corresponding to a second mode of operation, the host computer system may be inspected at any time, independent of the host personal computer and/or operating system's current state.

While a UFD device and a personal computer running a Microsoft® Windows® operating system are used as examples of a transient storage device used for integrity validation (also referred to as verification) and a host computing environment, respectively, it should be understood that these and any other examples described herein are non-limiting examples. Indeed, any secure execution environment and/or transient storage device may be used, as well as any operating system. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
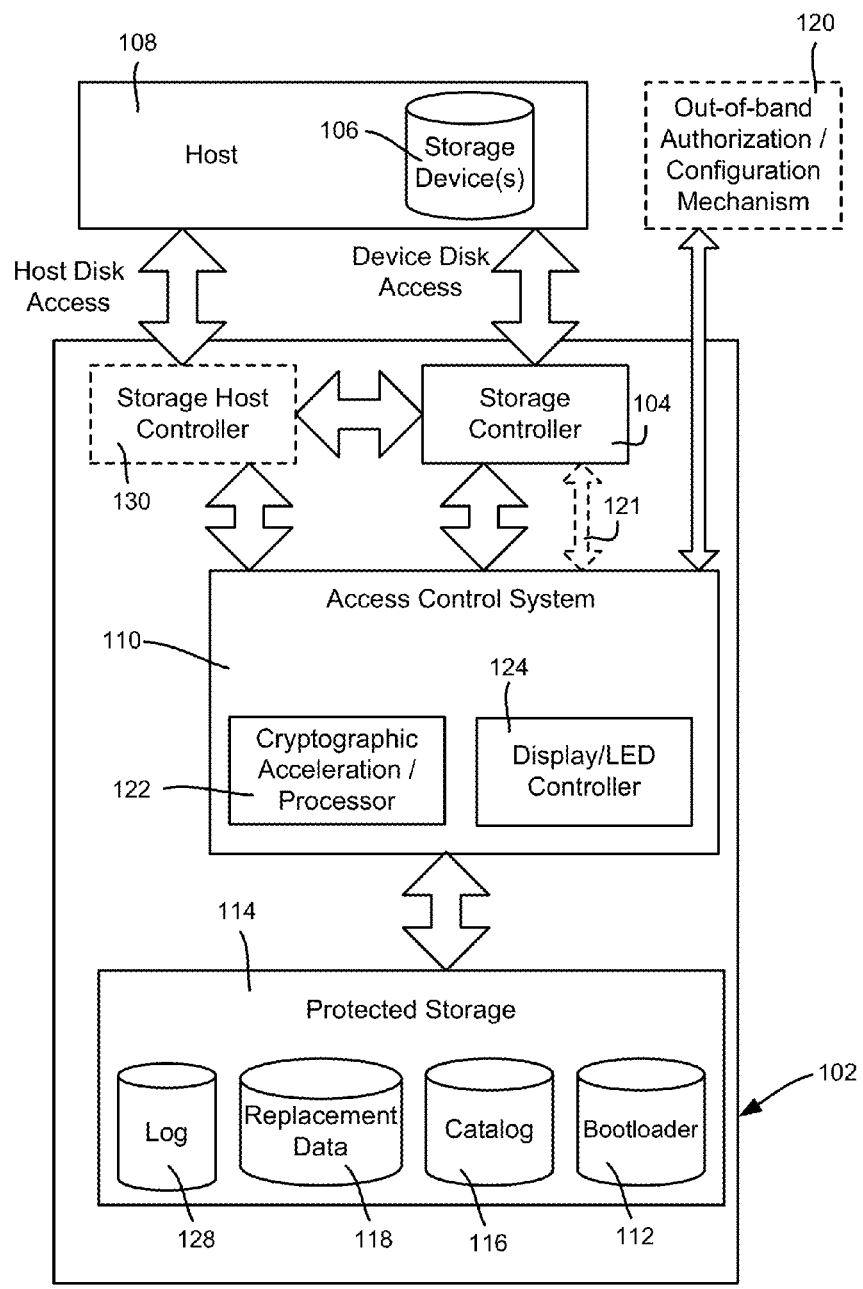
FIG. 1 is a block diagram showing example components for using a device to validate the integrity of a host computer system.

With reference to FIG. 1, one suitable transient storage device or secure execution environment (or more simply a "device" 102, including any suitable component or set of components, whether embedded, fixed, portable and so forth) for performing integrity validation includes a storage controller 104 that allows access to the host storage device 106 (e.g., one or more disks) residing in the host system 108, independent of the state of the host processor or operating system. In one aspect directed towards boot validation, the storage controller 104 verifies the integrity of the files or other data blocks on the host system storage device 106 as part of the boot process. To this end, bootloader code 112 maintained on the device's physical storage 114 is executed by the host system 108 from the device 102. In an alternative, BIOS code on the platform or the secure execution environment may execute code to interact with the transient storage device to validate the files.

In general, boot process verification works by booting the host from the protected storage associated with the device 102. This allows the device 102 to have control of the boot process to perform verifications before relinquishing control to the operating system present on the host. During the process, the bootloader code 112 compares certain files/blocks on the host storage device against information maintained in a device catalog 116. In one implementation, the information that is compared comprises hash values.

Based on the results of the comparisons, various actions may be taken including those described herein, e.g., visible or other (e.g., audible) indications may be output, information may be logged, the boot may be canceled, the device may replace files on the host storage, and so forth. Replacement data 118 may be present to allow the correct file or data block to replace an invalid file or data block.

Note that at least the part of the physical storage 114 is protected, including the storage containing the various controller logic, the bootloader code 112, catalog 116, replacement data 118 and any logged information, that is, such data is read only from the perspective of the host device. As a result, for example, a malicious host device cannot change the logic and/or catalog contents and thereby compromise the integrity validation process. In general, the user only needs to maintain physical possession of the device 102 (if portable) to ensure integrity, and further, access to the protected content may require credentials. To this end, a device access control system 110 provides a secure mechanism that authenticates and/or authorizes access to the protected storage of the physical storage 114. Alternatively, the transient storage device or secure execution environment may be pre-configured by the operating system vendor or other trusted third party, with a specific set of hashes that match the operating system and/or application versions shipped with the system. In this case, the protected storage is only updated by the vendor/trusted party/trusted application that also updates any binaries on the system when an update is required.

In an alternative, the protected storage may be maintained at a network location, e.g., "in the cloud" and accessed through networking components. For example, the transient storage device, or the secure execution environment-based device may utilize a networking link to the cloud to retrieve the hash values (or additional hash values), to report log files or issues discovered, and/or report actions taken on a given system. The secure execution environment-based device may utilize one of networking devices in the system (whether wired or wireless) to connect to the cloud. The transient storage device (USB) may include a wireless networking device as part of its logic (WiFi/3G/or the like). Note that this may be accomplished while the host system was powered off (but still plugged into the wall or having a battery in the case of a laptop), or while it is running.

As also represented in FIG. 1, an out-of-band authorization/configuration mechanism 120 may be used to interface with the access control system 110, such as to update the contents of the physical storage 114, including requiring proper credentials as desired. Note that this component is shown via a dashed block to indicate it typically is only coupled to the device 102 when such a reconfiguration and/or update are performed. In an alternative, the data channel illustrated in FIG. 1 by the dashed arrow 121 can be used instead of (or in addition to the out-of-band authorization/configuration mechanism 118), such as if the device chooses to expose its interfaces via an IEEE 1667 compatible silo, which provides access through a typical storage controller such as the storage controller 104.

For example, at least one LUN may organized based on an ACT (Addressable Command Target) paradigm, in which access to data may be effected in accordance with at least one silo. Each ACT may thus contain one or more silos. An example of an ACT paradigm having silos is promulgated by the Institute of Electrical & Electronics Engineers (IEEE) 1667 standards (e.g., "Standard Protocol for Authentication in Host Attachments of Transient Storage Devices"). In a current IEEE 1667 standard, a probe silo and a distributed authentication silo are described. Beyond these two silo types, proprietary silos are envisioned. In certain example implementations, a memory storage device may include a tamper detection configuration silo that comports with an IEEE 1667 standard to enable configuration actions via a standardized transport mechanism.

In one implementation, the catalog 116 contains hash values that are compared against hash values computed from the corresponding files/blocks of the host storage device 106. In this way, any files/blocks which were tampered with are detected. Example files in a Windows®-based environment may include the boot manager (bootmgr.exe), the code integrity module (ci.dll), the hardware abstraction layer (hal.dll), the kernel code (ntkernel.exe, ntos.exe) and so forth. Different hash values and replacement file versions may be maintained on the device 102.

The device 102 itself may contain a cryptographic acceleration/processor mechanism 122 that performs the hash computations, or the host computer system may be used to perform the computations, e.g., via a secure execution environment, implemented in hardware or software. The configuration mechanism 118, or a silo-exposed interface, (or possibly a manually actuated switch or the like on the device 102) may be used to dynamically or a priori select whether the device is to perform the hash computations, or whether they are calculated on the host. Giving the user the ability to specify whether the device or host performs the cryptographic operations allows the device to be used when verifying host data with low-powered CPUs or other low-power conditions. For example, if the device 102 is a low-powered cellular telephone, then the device processor may not be able to adequately handle the computations in a reasonable time, and the host processor may be chosen.

The device also includes a controller 124 by which the device controls its own output, such as to drive an LED or display, or both. The output indicates the state of the integrity validation check, in part because the output of the computing device cannot be trusted. For example, a malicious computer system may output text or graphics on its own screen that indicates the integrity verification was successful, when in fact the verification failed.

Figure 2:
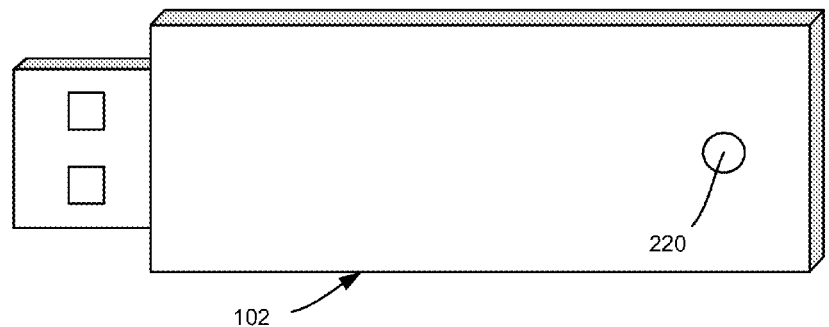
FIGS. 2 and 3 are representations of example devices that can validate the integrity of a host computer system, and indicate the result of the validation (and possibly other information).

FIG. 2 shows a display mechanism in the form of an LED 220. For example, the LED 220 can be controlled to change colors to show the state of the integrity validation, e.g., yellow signifies initialization or verification in progress, which turns to green if passed (the hash comparisons were successful and have been verified) or red if failed. Flash patterns and/or intensity may also be part of the output indication, e.g., flashing green may be used to indicate that the validation process passed but at least one invalid file was found (tampering apparently occurred) and was replaced by the device 102.

Figure 3:
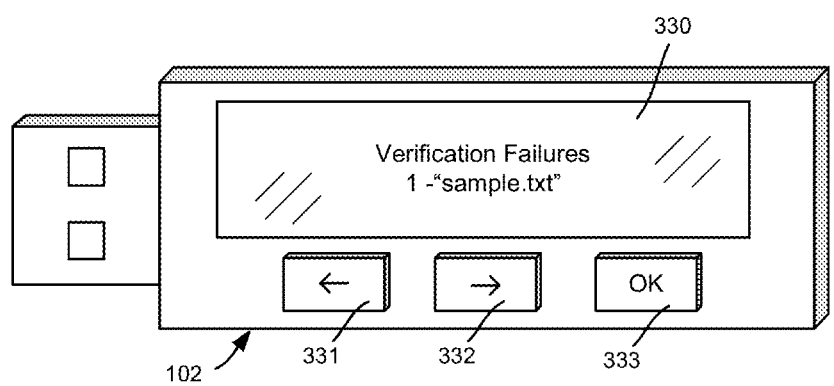

FIG. 3 shows how a device display 330 may be used to output readable validation information related to the state of the verification process. Buttons 331-333 or the like may be provided to allow a user to interact with the displayed content, e.g., to scroll through various output data. These visible interfaces may be used with boot process verification or anytime verification.

Turning to boot validation, when the host system boots from the secure bootloader stored in protected storage, the secure bootloader code 112 inspects accessible disks and determines which operating systems are recognizable based on the catalog 116. If an operating system is recognized, the data specified by the operating system manufacturer is accessed as specified in the catalog 116 from protected storage 114. If the catalog 116 (or a global variable such as controlled by a switch) specifies device hash computation, then the host's data is sent to the device 102 and cryptographic hashes of the data are computed by the processor mechanism 122. Otherwise the host system (e.g., its processor or other alternative means for cryptographic calculations) is used to perform the cryptographic hashes of the data.

The device 102 compares the computed hash against the hash stored in the catalog 116 from protected storage. If there is a mismatch, the device 102 takes action, such as to log the mismatch to a log 128 in the protected storage 114. In one alternative, the device 102 then indicates the occurrence of tampering on external display 330 and/or LED indicator 220 as described above. The bootloader code 112 is notified and indicates that the operating system or user specified data at that location on the host has had an occurrence of tampering and warns the user not to proceed with boot.

In another alternative, the device 102 may overwrite the bad data with known good data from protected storage and allow the boot to proceed. To this end, the bootloader code 112 provides the user with the option to replace tampered data with verified data (if available) from protected storage if the bootloader code 112 has the privilege to replace the data, e.g., the files on the host disk or disks. The option may be on demand, or the user may pre-choose the option when configuring the device 102.

Turning to another aspect, the device 102 can also be configured to perform "anytime" validation, that is, validation that can occur at a time other than boot time, such as on-demand by a user, periodically, randomly or at other times. For example, the user can plug in a UFD device and trigger a validation inspection, or trigger an embedded processor type device by a mechanism such as a button or key combination. Note that in FIG. 1, the device's host storage controller component 130 that facilitates anytime validation is shown FIG. 1 as a dashed block to indicate that anytime validation need not be performed on the same device as boot validation.

However, because the modifiable parts of the computer system as well as the operating system cannot be trusted to return true information, direct access to the memory and/or disk is used, e.g., via a secure computing environment and communication channel. In general, when the host platform contains an embedded, secure execution environment appropriately connected to the relevant buses, and the device 102 can couple to the environment, then anytime verification can be performed. For example, the device may include a storage host controller 130 that accesses the host disk drive without going through the storage controller of the host, such as via a secure execution environment (hardware or software). The memory contents may also be processed to ensure that files already loaded in memory have not been corrupted; note that memory usage and organization is operating system dependent, and thus different scans for different operating systems are used. Further note that hypervisor technology may be used as the secure execution environment.

In general, anytime verification works on the principle that when the transient storage device/secure execution environment (the device 102) is initialized and powered, it acts as a host controller to the disks and/or memory in order to read data and subsequently compute cryptographic hashes for comparison against its own storage. For example, this may be accomplished by having the device contain a storage controller, embedded processor and access to the appropriate buses and other components, which receive power. This mode of operation is independent of the state of most host conditions, provided that there is power to the disks to be inspected and to the device 102. One embodiment may also allow the device 102 to read the host BIOS and/or other host specific data not traditionally stored on disk, and compute associated cryptographic hashes for comparison.

Anytime verification operates as the device 102 accesses physical disk locations or other locations as specified in the catalog 116 and computes a cryptographic hash of the data. Optionally, the device 102 may verify the unique identity of the disks in question.

The device 102 compares the computed hash against the hash stored in the catalog 116. If there is a mismatch, the device 102 logs the mismatch to a log 128 (a file or the like) in the protected storage 114 and indicates the occurrence of tampering on the LED indicator/external display/, e.g., 220 and 330, respectively. In addition, the host may have software to indicate the status of the verification device as reported by the device 102, which continues to iterate over all entries specified in the catalog 116; note however that the host software is generally untrusted. Further, when the device 102 comprises a transient storage device, and the trusted software on the host does not interact with the transient storage device after a period of time (e.g., following device insertion), the device may report that the system cannot be trusted.

Figure 4:
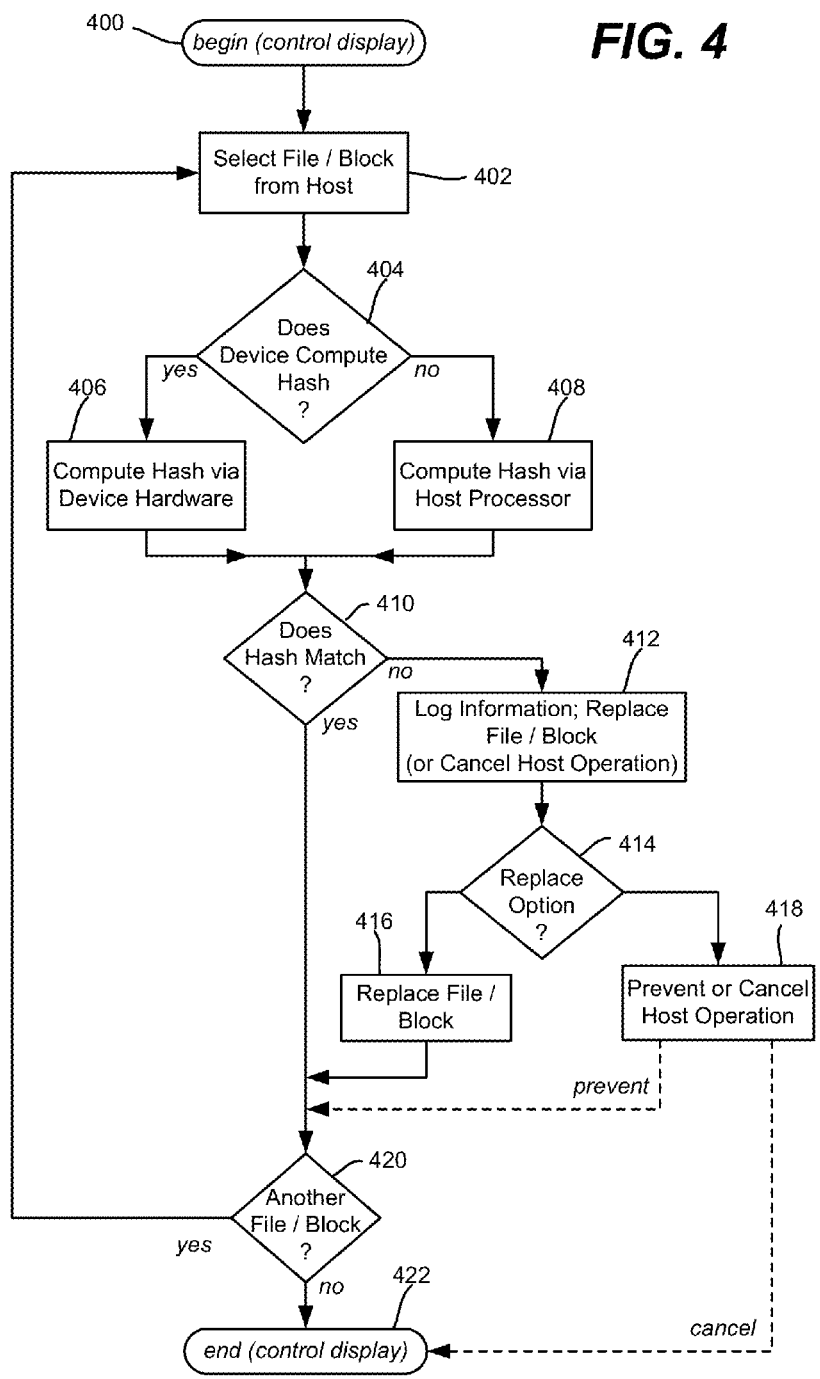
FIG. 4 is a flow diagram showing example steps that may be taken to validate the integrity of a host computer system.

FIG. 4 summarizes various example validation operations, beginning at step 400 where verification is triggered, e.g., at boot time or anytime. Note that the display may be controlled at this time to indicate the current device status, e.g., to indicate the validation operation is taking place.

Step 402 represents selecting a file or data block (on disk or in memory) to be verified, which is typically in host system storage, but may be in BIOS or other storage to be verified. Step 404 represents determining whether the device is configured to perform the hash computation, which as described above may be by default or by user choice. If so, the device cryptographically hashes the selected file or block (step 406), while if not, the host system performs the hash operation (step 408).

Step 410 represents comparing the computed hash with that of the catalog. If the hashes match, this data is verified and the next file or block similarly verified via step 420 looping back to step 402 until none remain.

If the hashes do not match, step 412 is executed to log the mismatch information. If at step 414 the device is set to replace the file or block (and contains the needed replacement data), step 416 is executed to perform the replacement. Note that replacement may not be possible in anytime verification, because, for example, of access control preventing replacement, the data being in use, a malicious file may have corrupted memory (e.g., loaded a malicious program) in other locations that do not have cataloged hashes and are thus not able to be evaluated, and so forth.

If not replaceable, step 418 is executed which may cancel further host operation (e.g., cancel the boot or shut down the system), or set a flag or the like to prevent further host operation, yet continue to evaluate any other files/data blocks. The decision to cancel the further operation as soon as any hash mismatch occurs, or prevent the further operation yet process the other files may be user determinable.

Step 422 represents ending the process when no files remain (or the further operation/boot is canceled). The display may be updated as necessary to indicate the results. Note that the display may be controlled at any time during the validation process, however a straightforward way to control an LED in one example is output yellow at step 400, and either green (successful) or red (unsuccessful) at step 422.

In this manner, a device comprising a transient storage device or secure execution environment, with protected storage to securely store cryptographic hashes of files and/or blocks, can compare cryptographic hashes of files and/or blocks. The device may contain hardware to compute the hashes. The device may securely store logs and/or other information pertaining to the hashing operations.

In various alternatives, the device may expose tamper detection configuration interfaces via a IEEE 1667 silo, may use a secure bootloader to allow operating system detection and inspection of host files prior to boot, and may be dynamically configured to determine whether the host CPU or device cryptographic hardware performs the hashing operation.

The device may replace host files from the protected device storage prior to transfer of boot control, and may use LEDs and/or an external character display on a transient storage device to indicate successful validation or tampering.

With respect to the catalog 116 (FIG. 1) and versioning, various ways to catalog the hashes to handle such differences are feasible. For example, one way is to simply have the device maintain all combinations of hashes, e.g., one set of hashes for version 1.0, another for version 1.1, and so on. Alternatively, as represented in FIG. 5, files may have an identifier, and also belong to one or more collections. Then, if a file needs to be replaced, any dependencies between files are known, so that other files can be appropriately replaced, even if they previously were determined to have a computed hash that matched a valid maintained hash.

Location data may be specified. Note that the user may be given an ARC path/wildcard option that the user can select depending on whether the device is to be used on one machine or multiple machines. The filename and hash are also maintained as represented in FIG. 5.

The selection as to where to perform the computation (device or host) may be cataloged and thus determined on a file-by-file basis. As mentioned above, a global mechanism such as a switch may be used, instead of or in addition to the "compute" field.

Optional data that may be maintained is a hash encryption algorithm identifier, e.g., an OID to identify it. In the example provided SHA-256 hashes are utilized, however a device may implement any such hashes, including the SHA, MD or CRC family of digests. Another option allows a user to specify a display string as to what is to be displayed, if anything other than a default output. As can be readily appreciated, additional fields may be present.

As described above with reference to the out-of-band authorization/configuration mechanism 120, for initial provisioning and subsequent update of the catalog containing the various data (e.g., possibly including location or locations, data hashes, supported operating systems and associated data, replacement files and/or log file data), the device 102 may expose interfaces, whether exposed via a IEEE 1667 silo presented by the device 102, or another mechanism. Credentials (e.g., a password, symmetric key, asymmetric key and so forth) may be required to modify catalog content in protected storage, and/or to create/modify provisioning credentials. The mechanism 120 also allows the user to create/modify/delete supported operating systems and the collection of data and associated hashes needed for tamper detection, and also to clear the log file. In an alternative, the vendor or trusted third party, may perform the updates, such as via a custom program.

Exemplary Operating Environment

Figure 6:
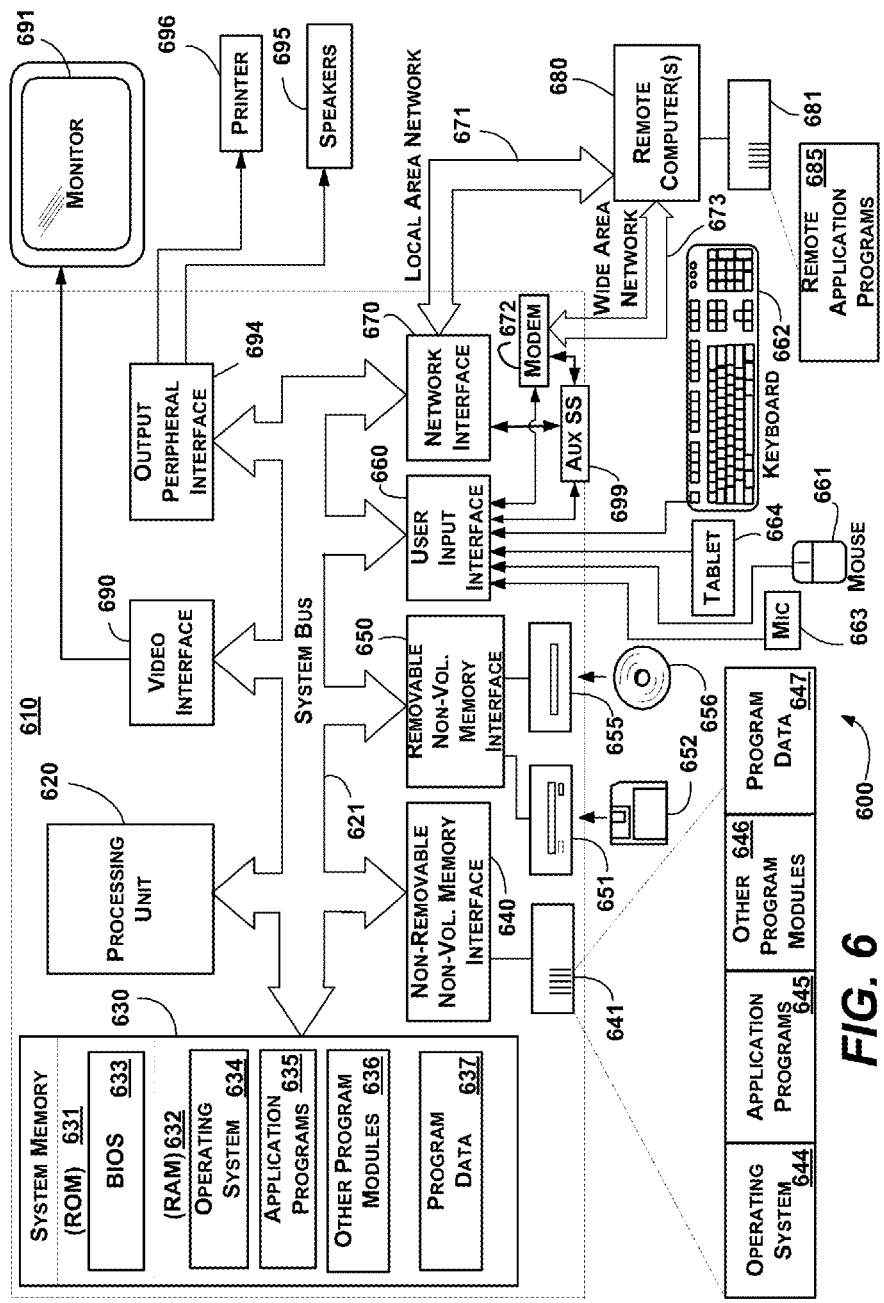
FIG. 6 shows an illustrative example of a computing environment into which various aspects of the present invention may be incorporated.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610, e.g., as a host computer system. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   accessing, by a device coupled to a host computing system, host system data;
   hashing the accessed host system data into a computed hash value;
   determining whether the hashing is performed on the host computing system or on another device;
   based on said determining, comparing the computed hash value with a hash value of information in protected storage of the device to validate whether the host system data matches the information in the protected storage;
   taking action if the host system data does not match the information in the protected storage; and
   changing the host system data, including replacing a first set of data that does not match the information in the protected storage with a second set of data that matches the information in the protected storage, and changing a third set of data based on a relationship with the first set of data.

2. The method of claim 1 wherein comparing the computed hash value with a hash value of the information in the protected storage further comprises:
   comparing hash values computed from the host system data against hash values maintained in the protected storage.

3. The method of claim 1 wherein comparing the computed hash value with a hash value of the information in the protected storage is a part of a boot process validation.

4. The method of claim 1 wherein taking the action further comprises:
   at least one of preventing a boot process from continuing or recommending cancellation of the boot process.

5. The method of claim 1 wherein taking the action further comprises:
   at least one of changing the host system data or logging information about the host system data not matching the information in the protected storage.

6. The method of claim 1 wherein taking the action further comprises:
   determining whether a replace option is selected; and
   if a determination is made that the replace option is selected, changing the host system data.

7. The method of claim 1 wherein comparing the computed hash value with a hash value of the information in the protected storage further comprises:
   comparing hash values of at least one of files or memory contents as part of an anytime validation.

8. The method of claim 1 wherein comparing the computed hash value with a hash value of the information in the protected storage further comprises:
   outputting visible information indicative of at least one of a status or a result of the comparing.

9. The method of claim 1 wherein comparing the computed hash value with a hash value of the information in the protected storage further comprises:
   utilizing a display mechanism on the device to output an indication of the comparing.

10. In a computing environment, a system comprising:
    an embedded processing device that validates a host system that stores host system data, the embedded processing device including:
    a protected storage device that maintains valid hash values corresponding to the host system data; and
    a bootloader device that accesses computed hash values of the host system data stored on the host system and determines whether hashing of the host system data stored on the host system is performed on the host system or on another device, and on condition that the hashing is performed on the host system, determines whether the computed hash values of the host system data matches the valid hash values maintained in the protected storage device; and
    replace, on condition that the hash values of the host system data stored on the host system do not match the valid hash values maintained in the protected storage device, the host system data with data corresponding to the valid hash values maintained in the protected storage device, or indicate that the host system validation failed.

11. The system of claim 10 wherein the embedded processing device comprises a secure execution environment contained on the host system.

12. The system of claim 10 wherein the bootloader device includes a controller coupled to an indicator that outputs an indication of whether the host system is valid.

13. The system of claim 10 further comprising:
    a mechanism that modifies data maintained in the protected storage of the embedded processing device.

14. The system of claim 10 wherein the embedded processing device includes a processor that computes cryptographic hash values from the host system data for matching by the bootloader device.

15. One or more computer storage devices having computer-executable instructions, which when executed by a computer, cause the computer to perform operations comprising:
    accessing data from a host computing system via a secure execution environment;
    selecting a set of data from the data of the host computing system;
    hashing the set of data selected into a computed hash value;
    comparing the computed hash value with one or more valid hash values of the data maintained in protected storage that is protected from access by the host computing system;
    determining whether the hashing is performed on the host computing system or on another device; and
    based on said determining, changing the data from the host computing system, including replacing at least one of the set of data that does not match the one or more valid hash values of the data in the protected storage with a second set of data that matches the one or more valid hash values in the protected storage, and changing a third set of data based on a relationship with the at least one of the set of data that does not match the one or more valid hash values of the data in the protected storage.

16. The one or more computer storage devices of claim 15 wherein the set of data selected comprises a file, and wherein changing the data from the host computing system comprises replacing the file with a file maintained in the protected storage.

17. The one or more computer storage devices of claim 15 having further computer-executable instructions comprising:
   providing visible information indicative of a status while comparing, or as part of changing the data from the host computing system, or both while comparing and as part of changing the data from the host computing system.

18. The one or more computer storage devices of claim 15 wherein the hashing of the set of data selected into the computed hash value further comprises:
   computing cryptographic hashes for comparison against the one or more valid hash values maintained in the protected storage.

19. The one or more computer storage devices of claim 15 having further computer-executable instructions comprising:
   modifying the one or more valid hash values maintained in the protected storage.

20. The one or more computer storage devices of claim 15 having further computer-executable instructions comprising:
   receiving input specifying whether the device or the host computing system performs the comparing.

* * * * *